(12) United States Patent  (10) Patent No.: US 8,467,330 B2
Gopalakrishnan et al.  (45) Date of Patent: Jun. 18, 2013

(54) METHOD OF SCHEDULING AND ADMISSION CONTROL FOR GUARANTEED BIT RATE AND/OR MAXIMUM BIT RATE SERVICES

(75) Inventors: Nandu Gopalakrishnan, Chatham, NJ (US); Dandan Wang, New Providence, NJ (US)

(73) Assignee: Alcatel Lucent, Paris (FR)

( * ) Notice: Subject to any disclaimer, the term of this patent is extended or adjusted under 35 U.S.C. 154(b) by 238 days.

(21) Appl. No.: 13/086,796

(22) Filed: Apr. 14, 2011

(65) Prior Publication Data

US 2012/0263120 A1   Oct. 18, 2012

(51) Int. Cl.
*H04B 7/14* (2006.01)
(52) U.S. Cl.
USPC .......................................................... 370/315
(58) Field of Classification Search
USPC ............... 379/201.01; 455/130, 334, 343.1, 455/343.2, 343.4; 370/315, 389, 395.1, 395.4
See application file for complete search history.

(56) References Cited

U.S. PATENT DOCUMENTS

| 7,072,360 B2 * | 7/2006 | Dravida et al. ............... 370/468 |
| 7,502,317 B2 | 3/2009 | Joshi et al. ..................... 370/230 |
| 7,688,788 B2 * | 3/2010 | Gefflaut et al. ............... 370/332 |
| 2002/0114334 A1 | 8/2002 | Yang ........................... 370/395.1 |
| 2005/0175014 A1 | 8/2005 | Patrick ........................... 370/395 |

FOREIGN PATENT DOCUMENTS

| EP | 1 469 640 A1 | 3/2004 |
| EP | 1 643 695 A1 | 3/2004 |
| EP | 1 986 455 A1 | 10/2008 |

OTHER PUBLICATIONS

International PCT/US2012/032659 Search Report dated Jun. 25, 2012.
Written Opinion of the International Searching Authority, Jul. 16, 2012.
Gopalakrishnan et al., Guaranteed Bit Rate (GBR) and Maximum Bit Rate (MBR) Scheduling and its relationship with Best Effort (BE) Proportional Fair (PF) Scheduling, ALCATEL-LUCENT Jan. 2011.
Wu et al., Capacity Optimization in Networks with Multiple Radio Access, under ALU publication clearance for ICC 2010.

* cited by examiner

*Primary Examiner* — Fan Ng
(74) *Attorney, Agent, or Firm* — Williams, Morgan & Amerson

(57) ABSTRACT

The present invention provides a method of scheduling guaranteed bit rate and/or maximum bit rate applications. Embodiments of the method may include setting, for a mobile node during a time interval, a first weight equal to a sum of a previous first weight associated with the mobile node during a previous time interval and a correction factor that is a linear function of a difference between a first bit rate and an indication of a throughput of the mobile node. Embodiments of the method may also include scheduling communication with the mobile node based on the first weight.

23 Claims, 10 Drawing Sheets

| Assumptions: sim time = 30 s, one user is GBR with weight > 1, others are all BE with weight=1 | Pedestrian A Channel Average SINR (same for all 8 users), dB | Scheduled using proposed algorithm | | Scheduled using product of tokens and proportional fairness | | Scheduled using ideal algorithm | |
|---|---|---|---|---|---|---|---|
| | | kbps | | kbps | Cell throughput of product (token) vs. cell throughput of ideal | kbps | Cell throughput of proposed vs. cell throughput of ideal |
| GBR user Throughput | 17 | 15228.78 | | 15037.61 | 0.99 | 15113.69 | 0.99 |
| NonGBR user throughput | | 1936.27 | | 1867.18 | 0.96 | 1949.27 | 1.01 |
| Cell throughput | | 28782.65 | | 28107.88 | 0.98 | 28758.63 | 1.00 |
| GBR user Throughput | 6 | 6637.26 | | 6500.87 | 0.98 | 6568.16 | 0.99 |
| NonGBR user throughput | | 1027.95 | | 871.79 | 0.85 | 1038.05 | 1.01 |
| Cell throughput | | 13832.94 | | 12603.40 | 0.91 | 13834.55 | 1.00 |
| GBR user Throughput | 0 | 3245.51 | | 3125.16 | 0.96 | 3210.53 | 0.99 |
| NonGBR user throughput | | 551.52 | | 433.09 | 0.79 | 557.23 | 1.01 |
| Cell throughput | | 7106.12 | | 6156.78 | 0.87 | 7111.16 | 1.00 |

Figure 4

METHOD OF SCHEDULING AND ADMISSION CONTROL FOR GUARANTEED BIT RATE AND/OR MAXIMUM BIT RATE SERVICES

BACKGROUND OF THE INVENTION

1. Field of the Invention

This invention relates generally to communication systems, and, more particularly, to wireless communication systems.

2. Description of the Related Art

Conventional wireless communication systems provide wireless connectivity using a network of access nodes such as access points, base stations, base station routers, and the like. Each access node allocates resources to support wireless communication over an air interface with one or more access terminals such as mobile units, mobile phones, smart phones, network interface cards, notebook devices, laptops, desktops, and the like. The air interface resources are usually defined in terms of the available time slots, channel codes, frequencies, bandwidths, transmission powers, and the like. Access nodes or other network entities include schedulers that allocate resources to the access terminals for wireless communication.

Access terminals are typically allocated a portion of the available resources based on a priority. For example, access terminals may be assigned a scheduling priority based on a quality-of-service (QoS) level and/or channel conditions associated with communication over the air interface. The QoS levels can be associated with a guaranteed bit rate (GBR) that is promised to the associated access terminal. Alternatively, some users or services may opt for best effort allocation of resources, which does not guarantee a particular bit rate and instead attempts to fairly distribute the available resources among the best effort users. In some cases, maximum bit rates may also be imposed on user traffic over the air interface. Scheduling algorithms and/or admission control algorithms attempt to balance the competing demands of various QoS and/or best effort users.

One algorithm defines the priority for each user as the product of a weight determined by the QoS level of the user and a ratio of the current channel rate to a long-term average throughput or bit rate. The weight is an exponential function of a normalized difference between the user's guaranteed bit rate and the average bit rate over a time window. Consequently, the weight increases (or decreases) exponentially when the user's throughput falls below (or rises above) the guaranteed bit rate. The weight is also a function of the duration of the error between the guaranteed bit rate and the average bit rate or throughput so that the increase or decrease in the weight is further amplified if it persists over time. The net effect of this aggressive exponential weighting factor is to rapidly drive the average bit rate towards the guaranteed bit rate and concurrently drive the weight towards the best effort weight of W=1.

Although the exponential weighting scheme can effectively maintain the guaranteed bit rates, it comes at a cost. For example, the inventors of the present application have demonstrated that the aggressive exponential weighting scheme can force the scheduler to allocate non-optimal channels and consequently can degrade the overall efficiency of the system. For example, extra resources may be needed to meet the GBR requirements of QoS users in non-optimal conditions, which may reduce the resources available to BE users. Furthermore, scheduling algorithms struggle to maintain the guaranteed bit rates of users that are located near cell edges when the scheduler employs the exponential weighting technique. The net effect is that the overall throughput is reduced relative to the optimum allocation.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for scheduling guaranteed bit rate and/or maximum bit rate applications. Embodiments of the method may include setting, for a mobile node during a time interval, a first weight equal to a sum of a previous first weight associated with the mobile node during a previous time interval and a correction factor that is a linear function of a difference between a first bit rate and an indication of a throughput of the mobile node. Embodiments of the method may also include scheduling communication with the mobile node based on the first weight.

In another embodiment, a method is provided for scheduling guaranteed bit rate and/or maximum bit rate applications. Embodiments of the method may include recursively defining a weight associated with a mobile node using a linear function of a previous value of the weight and a difference between a first bit rate and an indication of a throughput of the mobile node. Embodiments of the method may also include scheduling communication with the mobile node based on the first weight.

BRIEF DESCRIPTION OF THE DRAWINGS

The disclosed subject matter may be understood by reference to the following description taken in conjunction with the accompanying drawings, in which like reference numerals identify like elements, and in which:

FIG. 4 illustrates a comparison of throughput using different scheduling algorithms;

Figure 1:
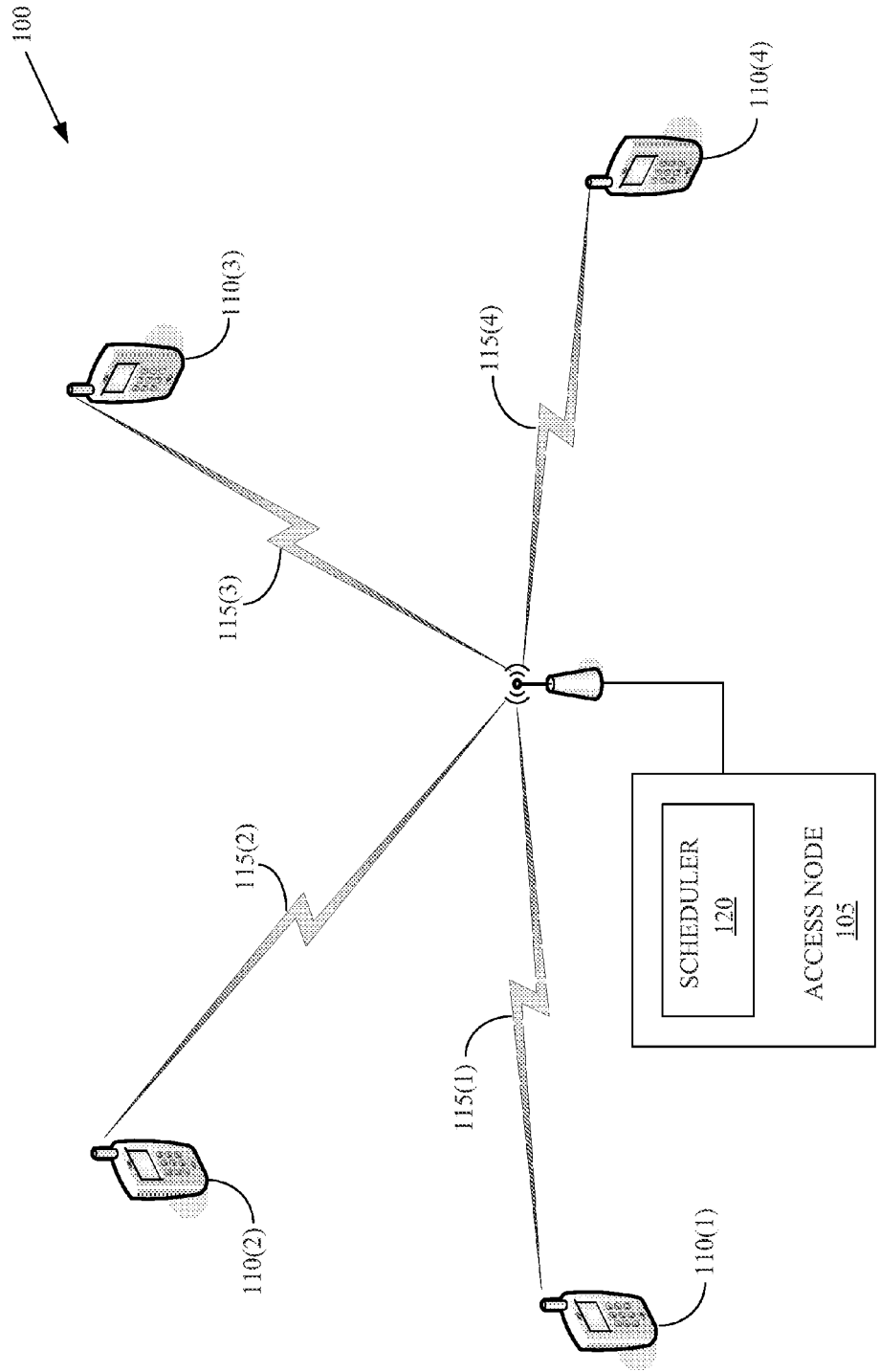
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques for scheduling and/or allocating resources for guaranteed bit rate and/or maximum bit rate applications in a wireless communication system. One conventional scheduling algorithm uses an exponential weighting factor to determine scheduling priorities for QoS users. The conventional wisdom is that the aggressive exponential weighting factor converges to a steady state in which the average bit rate equals the guaranteed bit rate and the user's weight is equal to 1 when the communication channel is also steady. However, the inventors of the present application have demonstrated that the steady state is rarely if ever achieved in practice. Furthermore, the target solution (ABR=GBR, W=1) of the aggressive exponential weighting technique is not sustainable even in steady channel conditions. For example, if a scheduler is allocating resources to a QoS user with a guaranteed bit rate and a best effort (BE) user that does not receive a guaranteed bit rate, then the steady state solution would assign W=1 to both users when the QoS user is receiving an average bit rate that is equal to the guaranteed bit rate. However, once both users are assigned the best effort weight, the scheduler "relaxes" and does not assign a relatively higher priority to the QoS user. The actual bit rate achieved by the QoS user can therefore slip to a value that is not equal to the GBR, which triggers an exponential correction to the weight to rapidly drive the average bit rate back towards the GBR. The aggressive exponential correction to the weight can therefore lead to large oscillating fluctuations in the value of the weight.

The consequences of weight oscillations may be mild in the absence of any channel fading. However, channel fading is present in virtually all channels used for wireless communication over an air interface. Schedulers allocate channel resources using "peak picking" techniques that attempt to optimize resource usage by allocating channels to users that have the highest channel quality at the scheduled time. The aggressive exponential weighting technique can undermine the goals of the peak picking technique by driving the weights up so rapidly that the scheduler is forced to allocate channels to the QoS user(s) even though these users may be experiencing channel quality degradation due to fading. Forcing the scheduler to allocate non-optimal channels can degrade the overall efficiency of the system. For example, extra resources may be needed to meet the GBR requirements of QoS users in non-optimal conditions and/or cell edge locations, which may reduce the resources available to BE users. The overall throughput may consequently be reduced relative to the optimum allocation.

The present application describes embodiments of an alternative scheduling technique that can achieve individual and total user throughputs that nearly match a theoretical ideal throughput. In one embodiment, scheduling is performed on the basis of weights that are recursively defined for each mobile node using a linear function of a previous value of the weight and a difference between a guaranteed bit rate and a measured throughput of the mobile node. For example, a first weight may be defined for a mobile node during a first time interval by setting the first weight equal to a second weight associated with the mobile node during a second (previous) time interval plus a correction factor that is a linear function of a difference between the mobile node's guaranteed bit rate and a measured throughput of the mobile node. Communication with the mobile node can then be scheduled based on the first weight, e.g., using a scheduling priority that is a function of the first weight.

FIG. 1 conceptually illustrates one exemplary embodiment of a wireless communication system 100. In the illustrated embodiment, the wireless communication system 100 includes an access node 105 that is configured to provide wireless connectivity to one or more mobile nodes 110 over air interfaces 115. The access node 105 may be a base station, an access point, base station router, a home base station router, a femtocell, and the like. The mobile nodes 110 may be cell phones, smart phones, laptops, desktop computers, and/or other wireless-capable devices. Wireless communication may be performed over the air interfaces 115 according to standards and/or protocols including second-generation (2G), third-generation (3G), fourth-generation (4G), and subsequent generations of standards and/or protocols defined by standards bodies such as the Third Generation Partnership Project (3GPP, 3GPP2), the Institute of Electronics and Electrical Engineers (IEEE), and the like. Techniques for communicating over air interfaces are known in the art and in the interest of clarity only those aspects of these communication techniques that are relevant to the claimed subject matter will be discussed herein.

The illustrated embodiment of the access node 105 includes a scheduler 120 that is configured to schedule wireless communication over the air interfaces 115. The scheduler 120 allocates resources of the air interfaces 115 to the mobile nodes 110 for communication. Exemplary resources that can be scheduled and/or allocated by the scheduler 120 include timeslots or other intervals, frequency/bandwidths, channels, channel codes, and the like. Other embodiments of the scheduler 120 may also be configured to determine packet sizes, modulation and coding schemes, transmission powers, and the like for transmissions over the air interfaces 115. The scheduler 120 may be implemented in a single functional entity or in multiple entities. Persons of ordinary skill in the art having benefit of the present disclosure should appreciate that the scheduler 120 may alternatively be deployed or implemented in locations outside of the access node 105.

In one embodiment, the scheduler 120 can be configured to schedule communications using an aggressive exponentially weighted priority technique. For example, a general weighted proportional fair scheduling algorithm can define the scheduling rank or priority P as:

$$P(i,n) = W(i,n)\rho(i,n)/T^{\alpha}(i,n),$$

where (i, n) are indices for the user and subframes, respectively, W is the quality-of-service weight assigned to the user during the indicated subframe (W=1 for best effort traffic), $\rho$ is the channel rate per unit of frequency domain resource (as a function of the signal-to-interference-plus-noise ratio (SINR), T is the medium or long-term average throughput for the user, and the exponent $\alpha$ is a fairness factor that can be set to 1 for strictly proportional fair scheduling, 0 for maximum SINR scheduling, or to a very large value for equal throughput scheduling. The weight factor, W, for the aggressive exponential the weighted priority technique may be defined as:

$$W(i,n) = \exp(\gamma \cdot TC(i,n)/GBR(i))$$

where the token counter, TC, may be defined as:

$$TC(i,n) = \min(\text{clipping\_factor} \cdot GBR(i), TC(i,n-1) + GBR(i) \cdot TTI - TBS(i,n))$$

In some embodiments, the token counter and the weight can alternatively be expressed as:

$$TC(i,n) = \min(\text{clipping\_factor} \cdot GBR(i), n \cdot GBR(i) - R_{avg}(i,n)) \cdot TTI$$

$$W(i,n) = \min(\text{max\_weight}, \exp(\gamma \cdot n \cdot \text{percent\_rate\_error}),$$

where:

$$\text{percent\_rate\_error} = (GBR(i) - R_{avg}(i,n))/GBR(i).$$

The token counter is initialized at zero and the guaranteed bit rate (GBR(i)) is equal to a value assigned to the user, e.g., a value indicated by subscription information indicating a quality-of-service for the user. The transmission time interval (TTI) is defined for the subframes and TBS indicates the over-the-air transport block size, which may be considered 0 for a retransmitted subframe in a hybrid automatic repeat request system. A growth or decay factor $\gamma$ is defined for the function and a clipping factor can be used to set the maximum weight that determines an upper limit for the weight W. The rate average for the air interface is given by $R_{avg}$.

The exponential rise time for weights defined according to the aggressive exponential weighting function may force the scheduler 120 to make scheduling decisions for time and/or frequency resources when the throughput lags GBR (guaranteed bit rate) or exceeds MBR (maximum bit rate). The scheduling decisions may therefore be made at potentially inopportune moments, e.g., when the channel strength is not necessarily conducive for transmission over the air interface is 115. Consequently, the scheduler 120 may be forced to allocate more resources than would be necessary if the scheduler 120 were allowed to schedule resources at more optimal times, e.g., when channel qualities are better. For example, the scheduler 120 may be forced to allocate more time/frequency/power resources to control the throughput within the required range than would be necessary if the channel qualities improved. Forcing allocations in this manner may reduce capacity and leave fewer resources for best effort (BE) services, thereby reducing the overall throughput of the wireless communication system 100. The inventors of the claimed subject matter have performed simulations of scheduling that indicate that the aggressive exponential weighting scheme can lead to up to a 22% loss in best effort throughput in many embodiments. Moreover, the simulations also indicate that the degradation in throughput may often be in double digits compared to the alternative techniques described herein. Another scenario tested also shows that schedulers 120 that implement the exponential weighting algorithm struggle to maintain GBR target for users at the cell edge while the alternative algorithms described herein can easily maintain GBR targets for cell edge users.

Figure 2:
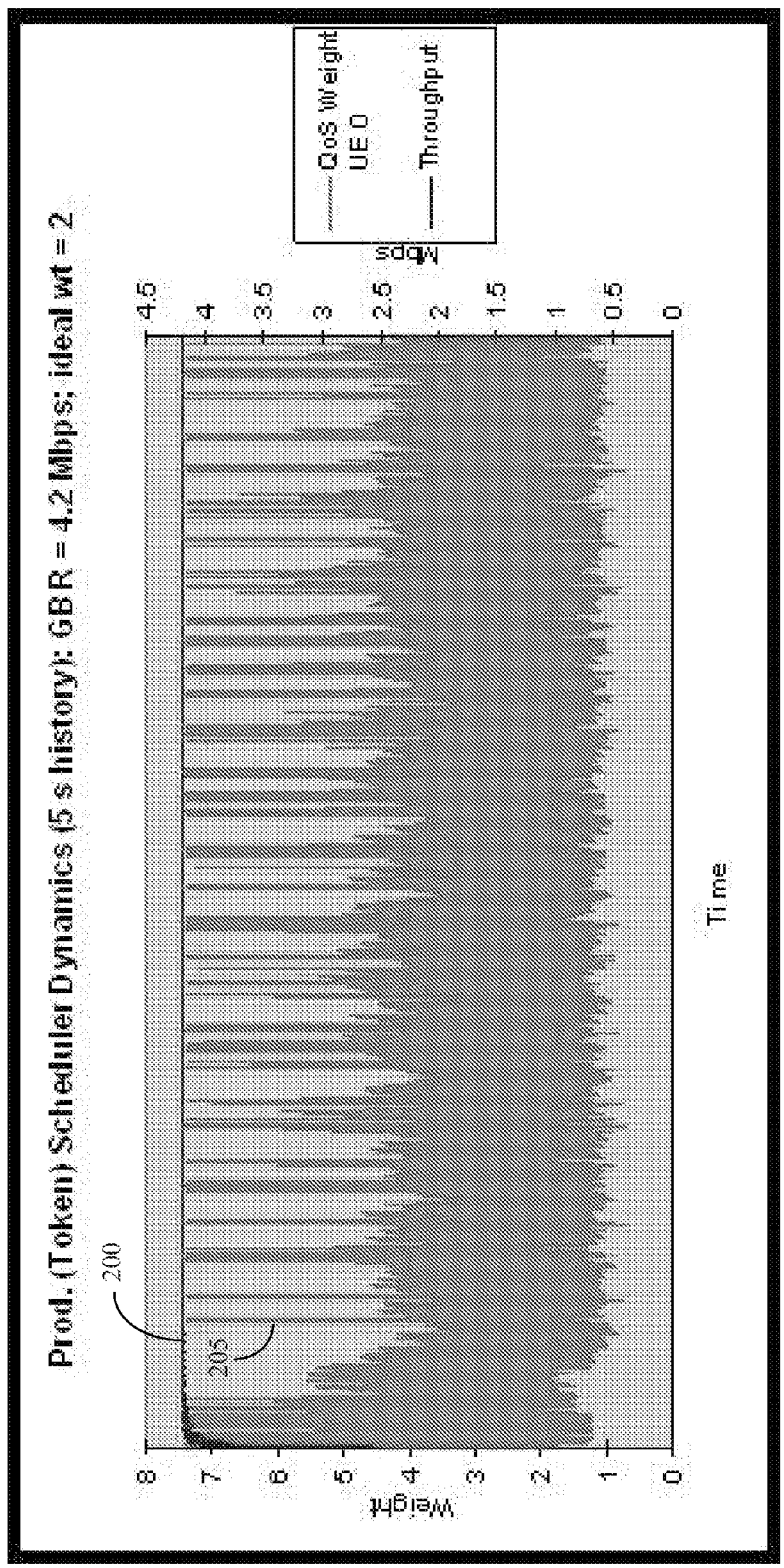
FIG. 2 shows data obtained by the inventors for a simulation of scheduler dynamics using an exponential weighting scheme to determine scheduling priorities.

FIG. 2 shows data obtained by the inventors for a simulation of scheduler dynamics using an exponential weighting scheme to determine scheduling priorities. In the illustrated embodiment, the horizontal axis indicates the time interval of the simulation, which is approximately 5 seconds in FIG. 2. The left-hand vertical axis indicates a weight assigned to user equipment and the right-hand vertical axis indicates the throughput for the user equipment in Mbps. The guaranteed bit rate for the user equipment is 4.2 Mbps and in the illustrated embodiment an ideal weight for achieving the desired quality of service is a weight of 2. As used herein, the term "ideal weight" refers to the value of the weight that is known to generate the guaranteed bit rate for the user in the system that is being simulated, e.g., for the particular mix of QoS and BE users that are distributed in a ring about the access node in these simulations.

In the simulation, the scheduler is very effective at maintaining throughput 200 for the user equipment at the guaranteed bit rate of 4.2 MBps. However, the simulation also demonstrates that the weights 205 assigned to the user equipment oscillate and fluctuate widely and rapidly. For example, the weights 205 assigned to the user equipment can increase or decrease by factors of two or more from one transmission time interval to the next. The exponentially weighted scheduling algorithm may therefore be useful for applications such as two-way voice/video (e.g., telephone calls or videoconferencing) because this type of application is typically subject to tight delay constraints accompanying the guaranteed bit rate constraint. At least in part because of the tight delay constraint, it may be difficult to pick the optimal channel instants (peaks) for scheduling and so it may be less important to emphasize channel awareness in the scheduling decisions. However, for applications such as one-way video and/or audio streaming, the delay constraints are relaxed because several seconds of buffering are typically implemented at the receiver. The guaranteed bit rate does not need to be maintained at every instant to support streaming applications. Schedulers may therefore presume that the delay constraints do not exist and may be configured to maintain the guaranteed bit rate in an average sense over a longer time scale. As a result, schedulers may pick optimal or close to optimal channel instants (peaks) for scheduling with proper scheduler weight design, as discussed herein. Implementing a weighted proportional fair (or other type of weighted fair) can also ensure fair division of resources subject to GBR and MBR constraints, as discussed herein.

Referring back to FIG. 1, the scheduler 120 may implement an alternative scheduling algorithm that determines scheduling weights using a linear function of the bit rate error. For example, the scheduling algorithm may determine the scheduling weights using a linear function of the ratio of the difference between the user's guaranteed bit rate (and/or maximum bit rate) and the user's measured throughput to the guaranteed bit rate (and/or the maximum bit rate) assigned to each user. The linear weighting algorithm can generate weight iterates using updates or increments that are in proportion to an error between targeted and actual rates. The inventors have demonstrated that embodiments of the linear weight sequence asymptotically converge to an underlying ideal (theoretically optimal) static weight as the throughput converges to GBR. The linear algorithm does not generate exponential swings in the values of user weights and consequently does not interfere with instantaneous allocation decisions so long as long term resource utilization fraction needs are met.

As discussed herein, scheduling priorities may be defined as a product of the scheduling weight and a factor that represents a measure of the channel quality. Reducing the variations in the amplitude of the weights (and increasing the timescale for changes in the weights) may reduce the sensitivity of the scheduling priority to the scheduling weight and may increase the sensitivity of the scheduling priority to the channel quality. The scheduler 120 may therefore perform channel aware opportunistic scheduling to preferentially schedule users when channel quality is good using techniques such as peak picking. The scheduler 120 may therefore be able to meet bit rate requirements easily and efficiently, e.g. using the least possible time, frequency and energy resources. This translates to increased capacity (of GBR and MBR type QoS users) and/or increased throughput (for BE traffic).

In one embodiment, the scheduler 120 recursively defines the weights for each user during each time interval. For example, the weights can be defined according to:

$$W(i, n) = \max\left(1.0, W_i(n-1) + \kappa(n)\frac{GBR_i - T_i(n)}{GBR_i}\right)$$

where $GBR_i$ is the guaranteed bit rate for user i, $T_i$ is the current measured throughput of the user, and $\kappa$ is a stepsize or noise averaging factor such as 0.1. The weights can alternatively be defined in terms of the current value of the token counter using the formula:

$$W(i, n) = \max\left(1.0, W_i(n-1) + \kappa(n)\frac{TC_i(n)}{n \cdot GBR_i}\right).$$

The weights can be initialized to the best effort value of 1 or, as discussed herein, they may be initialized as a function of the bandwidth(s) allocated using an iterative procedure that allocates bandwidth to mobile nodes subject to constraints imposed by the guaranteed bit rate(s) and/or maximum bit rate(s) for each of the mobile nodes.

Figure 3:
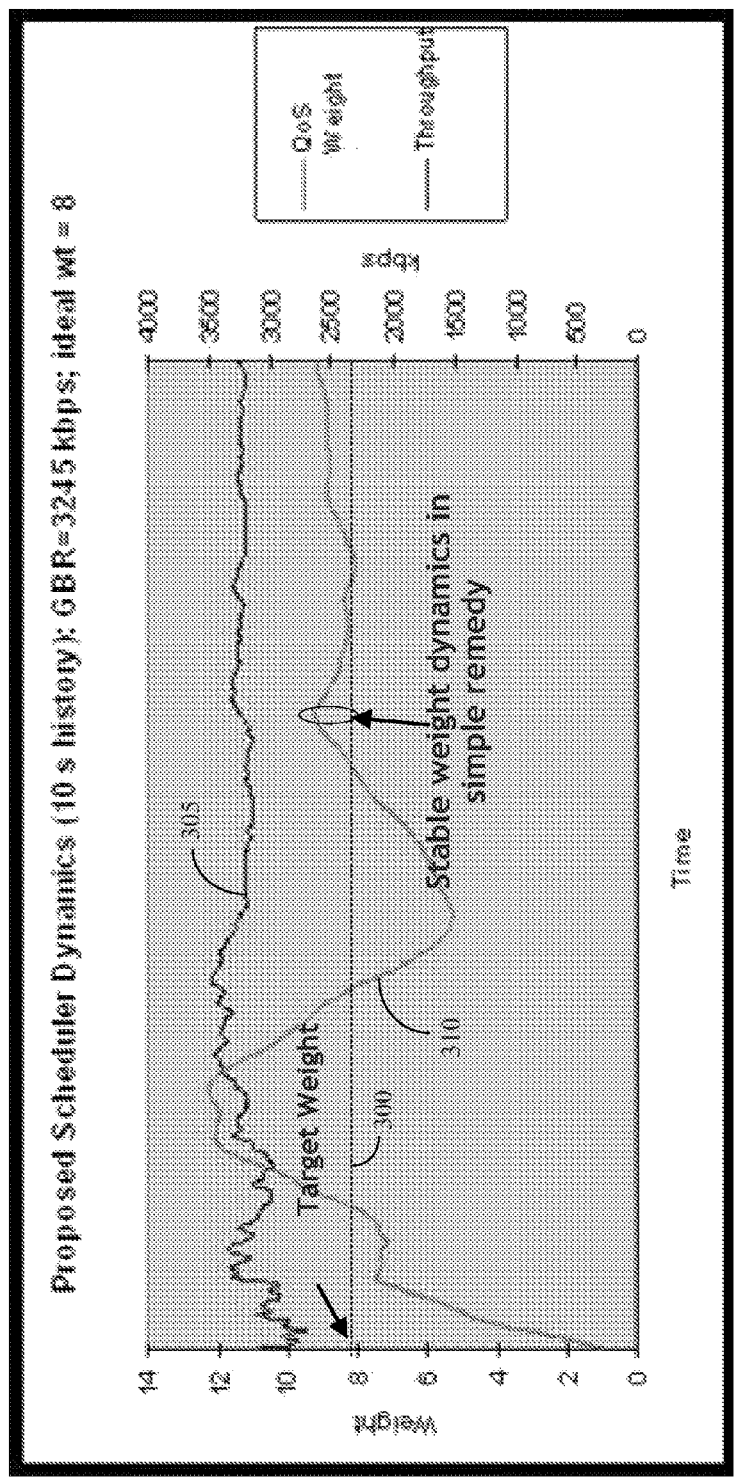
FIG. 3 shows data obtained by the inventors for a simulation of scheduler dynamics using a linear weighting scheme to determine scheduling priorities.

FIG. 3 shows data obtained by the inventors for a simulation of scheduler dynamics using a linear weighting scheme to determine scheduling priorities. In the illustrated embodiment, the horizontal axis indicates the time interval of the simulation, which is approximately 10 seconds in FIG. 3. The left-hand vertical axis indicates a weight assigned to user equipment and the right-hand vertical axis indicates the throughput for the user equipment. The guaranteed bit rate for the user equipment is 3245 kbps and in the illustrated embodiment an ideal weight for achieving the desired quality of service is a weight of 8 as indicated by the dashed line 300. As used herein, the term "ideal weight" refers to the value of the weight that is known to generate the guaranteed bit rate for the user in the system that is being simulated, e.g., for the particular mix of QoS and BE users that are distributed in a ring about the access node in these simulations.

In the illustrated embodiment, the weight 310 assigned to the user is initialized at the best effort weight of 1.0 and initially rises to a weight 310 of approximately 12 before gradually converging on a weight 310 that is approximately equal to the ideal weight of 8. The throughput 305 for the user begins at around 3000 kbps before gradually settling to a value that is close to the target throughput of 3245 kbps. The linear weighting algorithm successfully achieves the target throughput, although it takes somewhat longer for the throughput 305 to approach the guaranteed bit rate when compared to the simulation of the exponential weighting technique shown in FIG. 2. Once the throughput 305 reaches the guaranteed bit rate it fluctuates about this value slightly more than the variations seen in FIG. 2. However, the comparison of the simulations shown in FIGS. 2-3 also illustrates significant advantages to the linear weighting algorithm. For example, the weight 310 converges to the ideal weight of 8 and then remains at this value with comparatively little fluctuation. For another example, even in the earliest stages of the simulation, the timescale for fluctuations in the weight 310 is much longer than the transmission time intervals and the amplitude of the fluctuations in the weight 310 between transmission time intervals is a small fraction of the values of the weight 310.

A comparison of simulations shown in FIGS. 2 and 3 further illustrates that the scheduler dynamics produced by the exponential weighting algorithm require a larger fraction of (bandwidth multiplied by time) resources to achieve a given rate. Consequently, fewer resources remain available for other GBR and/or BE users, which may lead to a reduced GBR capacity and/or BE throughput. The exponentially weighted algorithm causes the scheduler to behave like a PDB constrained scheduler, which is not needed for buffered streaming QoS applications, grade of service (GoS) user rate tiers for BE applications, and the like. On the other hand, a scheduler that asymptotically guarantees throughput and corresponding resource fractions using a linear weighting algorithm may be more efficient. For example, the linear weighting algorithm described herein may guarantee long term throughput (which is a critical QoE metric for applications such as buffered streaming) by supporting a stable weight. The linear weighting algorithm is simple to implement and demonstrably more efficient.

FIG. 4 illustrates a comparison 400 of throughput using different scheduling algorithms. In the illustrated embodiment, the comparison 400 includes a first column 405 associated with an assumed "ideal" proportional fair scheduler, a second column 410 associated with a token algorithm that uses the aggressive exponentially weighted technique, and a third column 415 associated with an algorithm that uses embodiments of the linear weighted technique described herein. The simulation used to generate the results shown in FIG. 4 assumes that there are eight users and the users are distributed in a ring around the access node. One of these users has a guaranteed bit rate and the other users are best effort users. The rows are distinguished by the distance of the users from the access node (17 dB, 6 dB, and 0 dB) and the guaranteed bit rate assigned to the QoS user (15228.78 kbps, 6637.26 kbps, and 3245.51 kbps). The first column 405 indicates the distance of the users from the access node and the ideal throughput for the GBR/QoS user, the ideal throughput for each of the best effort users, and the ideal overall throughput for all users. The second and third columns 410, 415 indicate the simulated throughputs and the ratio of the simulated throughputs to the ideal throughput.

For users that are near the center of the cell (17 dB), both the exponential weighting algorithm and the linear weighting algorithm produce throughputs for the QoS user, the best effort users, and the aggregate of all users that are very close (e.g., within 1% or 2%) to the ideal throughputs. However, as the distance of the users from the center of the cell increases (from 17 dB to 6 dB to 0 dB), the exponential weighting algorithm begins to deviate significantly from the ideal throughputs. For example, for edge users (0 dB), the throughput for the QoS user is only 96% of ideal, the throughput for the best effort users is 79% of ideal, and the overall throughput is only 87% of ideal. In contrast, the linear weighting algorithm produces throughputs for the edge users that are substantially equal to the ideal values (e.g., within 1% or less). FIG. 4 also illustrates that the throughputs produced by the linear weighting algorithm in the illustrated simulation are largely insensitive to the locations of the users and are substantially equal to the ideal values at all distances. The inventors of the present application have also demonstrated that the weight convergence is robust (e.g. the weight convergence behaves in a manner that is similar to the behavior illustrated in FIG. 4 in a variety of scenarios) and can track changes in the statistics of the system (e.g., average channel quality variations due to mobility, changes in loading due to user arrivals/departures or bursty traffic). Moreover, in alternative embodiments, the speed of the convergence can be traded off for overshoot damping by appropriate choice of the averaging parameter.

Figure 5:
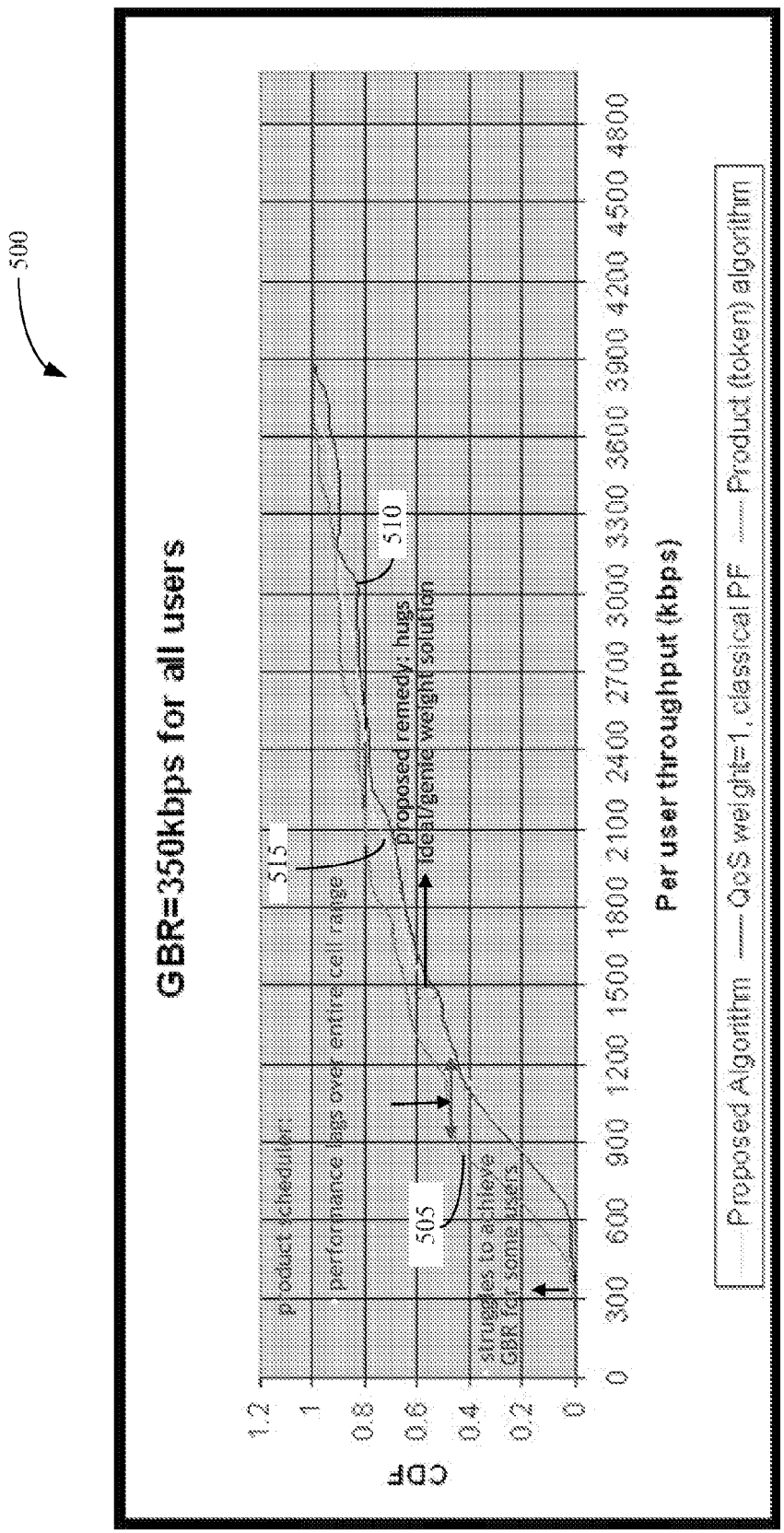
FIG. 5 illustrates a comparison of the cumulative distribution function for an assumed user distribution using different scheduling algorithms.

FIG. 5 illustrates a comparison 500 of the cumulative distribution function determined by the inventors for an assumed user distribution using different scheduling algorithms. A cumulative distribution function (CDF) gives the fraction of users (on the vertical axis) that are achieving a per user throughput (on the horizontal axis). The cumulative distribution function is therefore zero until the per-user throughput reaches the minimum value achieved by at least one user. The cumulative distribution function monotonically increases until it reaches a value of 1 at the maximum throughput achieved by any user. In the illustrated embodiment, the comparison 500 includes a first CDF 505 associated with an "ideal" proportional fair scheduler, a second CDF 510 associated with a token algorithm that uses the aggressive exponentially weighted technique, and a third CDF 515 associated with an algorithm that uses embodiments of the linear weighted technique described herein. The simulation used to generate the results shown in FIG. 5 assumes that 10 users are distributed at different locations relative to the access node and that fast fading causes channel quality variations. The users have a guaranteed bit rate of 350 kbps.

The first CDF 505 begins at the guaranteed bit rate of 350 kbps since some of the users are getting at least this guaranteed bit rate. The first CDF 505 monotonically increases to a value of 1 at a maximum per-user throughput of approximately 3900 kbps. The second CDF 510 begins at a per-user throughput of only 290 kbps, which is less than the guaranteed bit rate and indicates that the exponential weighting algorithm is unable to achieve the guaranteed bit rate for some users, e.g., edge users and/or users experiencing relatively deep fading. Furthermore, the second CDF 510 significantly lags the performance of the "ideal" first CDF 505 because the value of the second CDF 510 at each value of the per-user throughput is significantly larger than the value of the first CDF 505. This indicates that the exponential weighting algorithm causes the scheduler to schedule more users at lower bit rates relative to the "ideal" first CDF 505. In contrast, the third CDF 515 tracks the first CDF 505 almost perfectly and exhibits only small deviations from the "ideal" value of the first CDF 505.

Table 1 gives the relative performance of the different algorithms in terms of their cell throughput for the simulation used to generate the cumulative distribution function is shown in FIG. 5. The results shown in Table 1 indicate that the relative performance of the linear weighting algorithm is within a few percentage points of the performance of the ideal proportional fair scheduling algorithm. The exponential weighting algorithm, on the other hand, has a relative performance that is almost 17% lower than the ideal performance. This is a significant drop in the efficiency achieved by the scheduling algorithm.

TABLE 1

| Scheduling Algorithm | Cell Throughput (kbps) | Relative Performance (%) |
|---|---|---|
| QOS Weight = 1, PF | 13805 | 100 |
| Linear Weighting Algorithm | 13522 | 97.95 |
| Exponential Weighting Algorithm | 11541 | 83.6 |

Referring back to FIG. 1, the scheduler 120 can initialize the priorities and/or weights for the mobile nodes 110 using various different techniques. In one embodiment, the scheduler 120 can initialize the weights for the mobile nodes 110 to the best effort value of W=1. Alternatively, an initialization algorithm may be used to perform a resource and weight calculation for each GBR/MBR user to generate a starting point for initializing or resetting the recursive filter that generates the weights. Embodiments of this algorithm may be implemented in an off-line processor (e.g., a batch processor) in the scheduler 120 or elsewhere in the wireless communication system 100. Embodiments of the algorithm can also be employed to perform call admission control (e.g., based on longer term average channel measurements) by gauging or determining the resource allocation needed to admit a new user or users with arbitrary GBR and/or MBR constraints. Embodiments of the algorithm may also estimate the resource allocation fraction of existing admitted users based on their average channel quality measurements and GBR/MBR targets or the algorithm may alternatively use measurements of the channel quality/targets from the scheduler 120.

Figure 6:
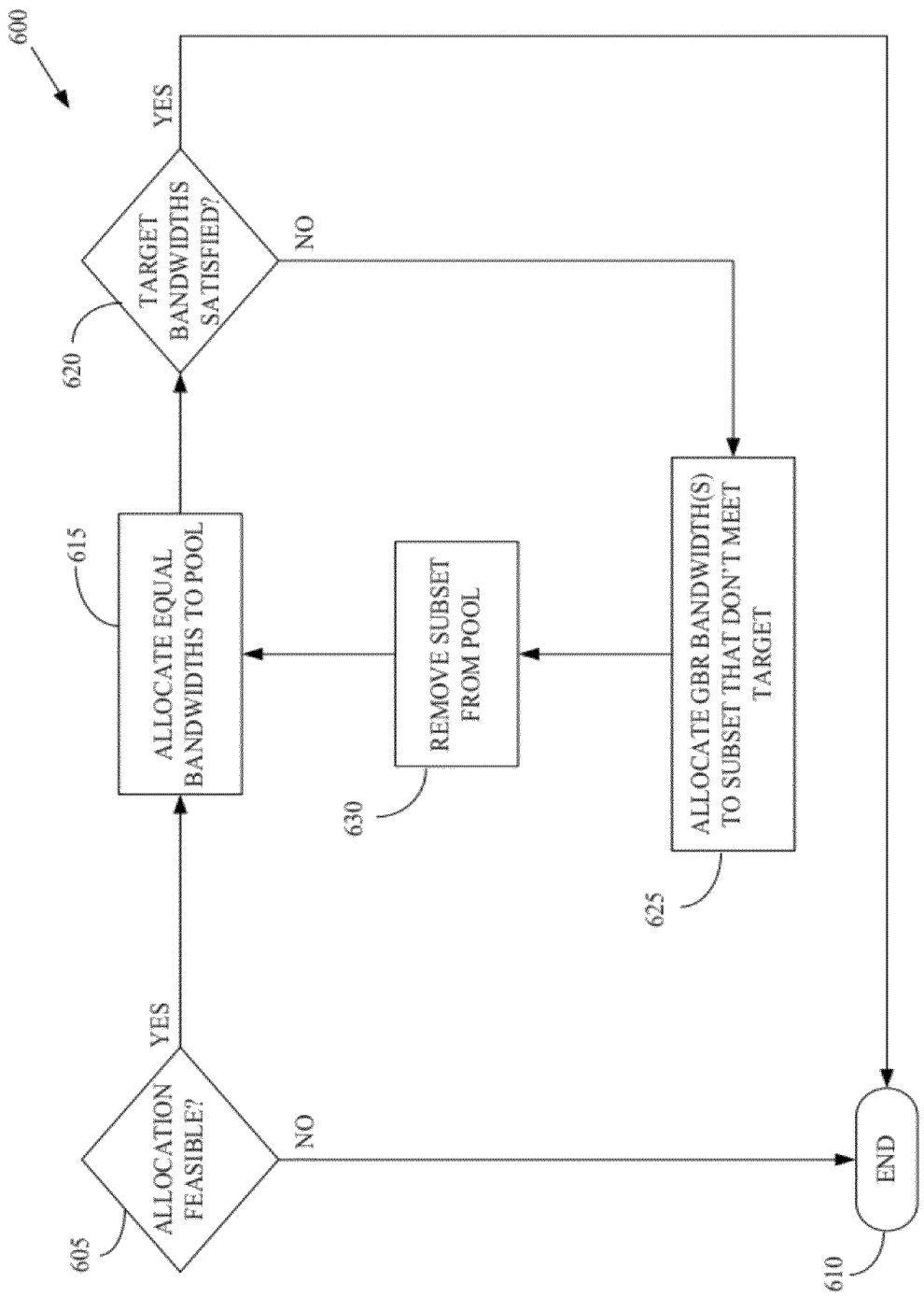
FIG. 6 conceptually illustrates one exemplary embodiment of a method for allocating bandwidth to mobile nodes.

FIG. 6 conceptually illustrates one exemplary embodiment of a method 600 for allocating bandwidth to mobile nodes. In the illustrated embodiment, a functional entity that implements the method 600 (such as the scheduler 120 shown in FIG. 1) determines (at 605) whether the requested allocation is feasible. For example, a scheduler can add up all the bandwidth resources required for the guaranteed bit rates for the mobile nodes (e.g., all the users in a pool of users that are being allocated resources) and determine whether sufficient bandwidth is available to satisfy at least these minimum requirements. Best effort users can be assumed to be guaranteed no bandwidth for the purposes of determining (at 605) whether the requested allocation is feasible. If the proposed allocation is not feasible, then the method 600 may end (at 610). Alternatively, an alternative resource allocation may be proposed and the system may determine (at 605) whether or not the new allocation is feasible. For example, the pool of users having guaranteed bit rates may be reduced by dropping some users. This approach may be particularly useful when the method 600 is used for admission control.

If the allocation is feasible, equal bandwidth may be allocated (at 615) to each user in the pool of users so that the total available bandwidth is equally divided among all of the users in the pool. The scheduler may then determine (at 620) whether the target bandwidths for all of the users are satisfied. For example, the scheduler may determine (at 620) whether the equal bandwidth allocation satisfies the guaranteed bit rate requirements of all of the QoS users. If the target bandwidths are all satisfied, allocation of the resources may end (at 610). However, if some of the users require more bandwidth to meet their guaranteed bit rate requirements, then the scheduler may allocate (at 625) enough resources to these users to meet their guaranteed bit rate requirements. In one embodiment, the scheduler attempts to allocate (at 625) only sufficient resources to meet the guaranteed bit rate requirements and substantially no excess resources. As used herein, the phrase "substantially no excess resources" is used to indicate that the scheduler determines that it has allocated only enough resources to meet the guaranteed bit rate requirements within a specified tolerance and that users are not able to achieve bit rates above the guaranteed bit rate tolerance level using the allocated resources. The users that have received a resource/bandwidth allocation are removed (at 630) from the pool of users. The scheduler then allocates the remaining unallocated resources/bandwidth fairly to the remaining users by allocating (at 615) equal portions of the remaining bandwidth to the users that remain in the pool.

This procedure iterates until all of the bandwidth requirements have been met and all of the bandwidth has been allocated. Since the allocation was determined (at 605) to be feasible, an allocation that meets all of these requirements exists. The weights and/or priorities can be initialized by determining the weights and/or priorities as a function of the allocated resources/bandwidth. For example, the best effort users and any QoS users that receive the same bandwidth allocation as the best effort users can be assigned an initial weight of W=1. Users that are allocated larger bandwidths to meet their guaranteed bit rate requirements may be assigned larger weights so that users with the largest bandwidth requirements are initialized to the largest weights and users with relatively smaller bandwidth requirements are initialized to relatively smaller weights.

Figure 7:
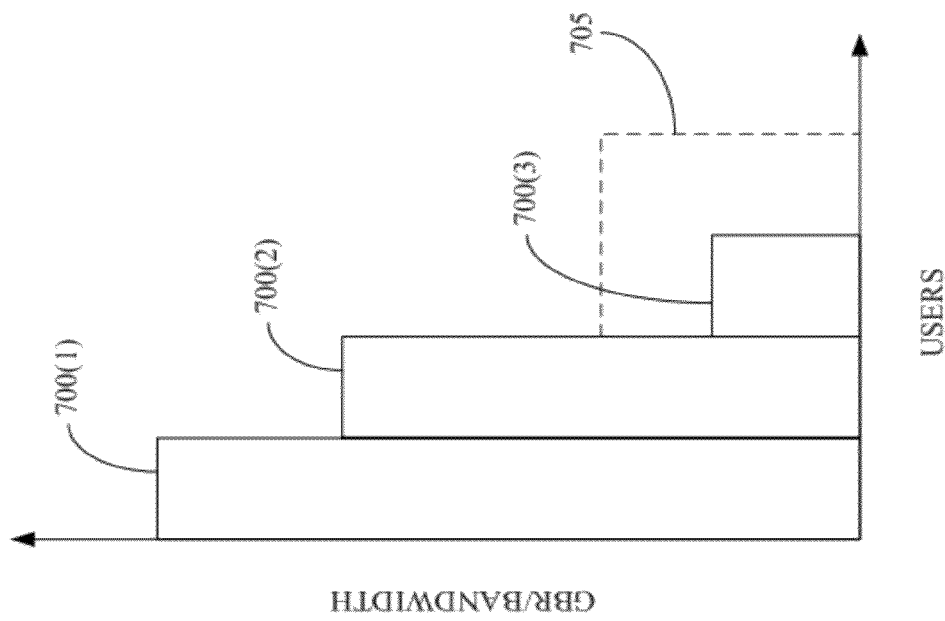
FIG. 7 depicts an exemplary bandwidth allocation for distribution of four users.

FIG. 7 depicts an exemplary bandwidth allocation for distribution of four users. In the illustrated embodiment, three of the users are QoS users that have guaranteed bit rate requirements 700 and one of the users is a best effort user. The first two users have comparatively large guaranteed bit rate requirements 700(1-2) and are therefore allocated correspondingly large bandwidths. However, after the bandwidths are allocated to these users, sufficient bandwidth remains to fairly divide the remaining bandwidth 705 between the remaining two users while also satisfying the guaranteed bit rate requirements of the third QoS user.

Referring back to FIG. 1, the linear scheduling algorithm can be generalized to account for multiple bit rate requirements. For example, the scheduler 120 may determine weights for users using linear recursion formulas that are functions of a guaranteed bit rate (e.g., a minimum bit rate) and a maximum bit rate (MBR) permitted for each user or mobile node. In one embodiment, the scheduler 120 recursively defines the weights for each user during each time interval. For example, the weights associated with the guaranteed bit rate and the maximum bit rate can be defined according to:

$$X(i, n) = \max\left(1.0, X_i(n-1) + \kappa(n)\frac{GBR_i - T_i(n)}{GBR_i}\right)$$

$$Y(i, n) = \max\left(1.0, Y_i(n-1) + \kappa(n)\frac{MBR_i - T_i(n)}{MBR_i}\right)$$

where $GBR_i$ is the guaranteed bit rate for user i, $MBR_i$ is the maximum bit rate for user i, $T_i$ is the current measured throughput of the user, and $\kappa$ is a stepsize or noise averaging factor such as 0.1. The weights can alternatively be defined in terms of the current value of the token counter using the formula:

$$X(i, n) = \max\left(1.0, X_i(n-1) + \kappa(n)\frac{TC_i(n)}{n \cdot GBR_i}\right).$$

$$Y(i, n) = \max\left(1.0, Y_i(n-1) + \kappa(n)\frac{TC_i(n)}{n \cdot MBR_i}\right)$$

In the illustrated embodiment, the token counters are the current values of the GBR and MBR error token counters, respectively. The weight assigned to a particular user or mobile node can then be set so that it is at least as large as the guaranteed bit rate (or the best effort weight of 1) while not exceeding the maximum bit rate. For example, the weight can be defined as:

$$W_i(n) = \min(Y_i(n), \max(X_i(n), 1.0))$$

Weights can be initialized to the best effort value of 1 or, as discussed herein, they may be initialized as a function of the bandwidth(s) allocated using an iterative procedure that allocates bandwidth to mobile nodes subject to constraints imposed by the guaranteed bit rate(s) and/or maximum bit rate(s) for each of the mobile nodes.

Figure 8:
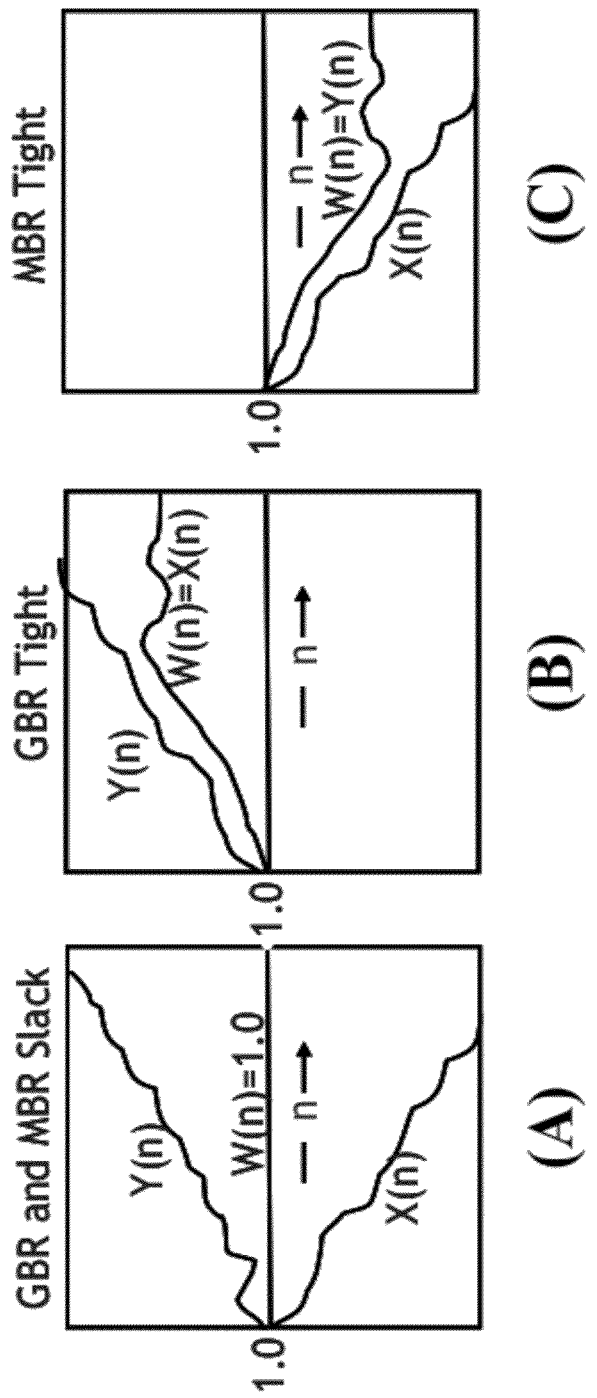
FIGS. 8A-C conceptually illustrate the weights that are allocated to the mobile node using the linear recursion relations for both the guaranteed bit rate and a maximum bit rate requirements.

FIGS. 8A-C conceptually illustrates the weights that are allocated to the mobile node using the linear recursion relations for both the guaranteed bit rate and a maximum bit rate requirements. In the illustrated embodiment, the weights are indicated on the vertical axis and the temporal index (n) is indicated on the horizontal axis so that time increases from left to right. FIG. 8A depicts the weights that are assigned when a proportionally fair allocation of resources to QoS users and best effort users satisfies both the guaranteed bit rate and the maximum bit rate requirements. These may be referred to as the "GBR slack" and "MBR slack" cases, respectively. In this case, weights for all the users maybe set to the best effort value of W=1.

FIG. 8B depicts a scenario in which the guaranteed bit rate requirements are met by allocating more than the proportionally fair amount of resources so that a sufficient amount of resources/bandwidth is allocated to meet the guaranteed bit rate requirement. This case may be referred to as "GBR tight." In this case, the maximum bit rate requirement is met because additional resources beyond those required to meet the guaranteed bit rate requirement are not allocated. The weight then tracks the rate determined based on the guaranteed bit rate. The overall weight is convergent and stable at a value W>1, as indicated by the relatively flat line at large temporal indices.

FIG. 8C depicts a scenario in which the maximum bit rate requirements is met by allocating less than the proportionally fair amount of resources so that the amount of resources/bandwidth allocated to the user or mobile node does not allow the user or mobile node to exceed the maximum bit rate requirement. This case may be referred to as "MBR tight." In this case, the guaranteed bit rate requirement is met because the maximum bit rate is defined to be larger than the guaranteed bit rate so sufficient resources are by definition allocated to meet the guaranteed bit rate requirement when the maximum bit rate requirement is met. The weight then tracks the rate determined based on the maximum bit rate. The overall weight is convergent and stable at a value W<1, as indicated by the relatively flat line at large temporal indices.

Figure 9A:
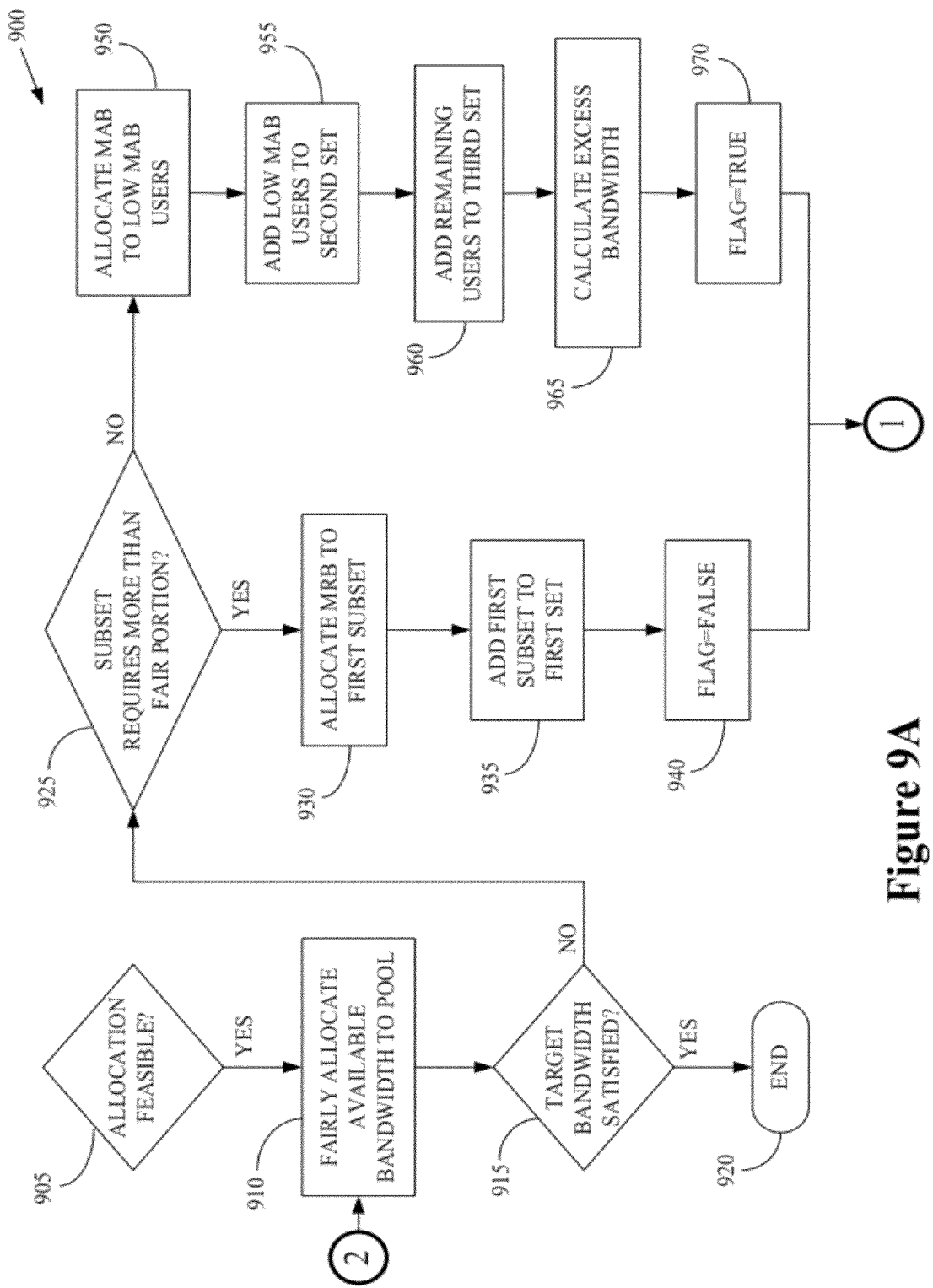
FIGS. 9A-B conceptually illustrate one exemplary embodiment of a method for allocating and/or initializing bandwidth to users based on guaranteed bit rate and maximum bit rate requirements.
Figure 9B:
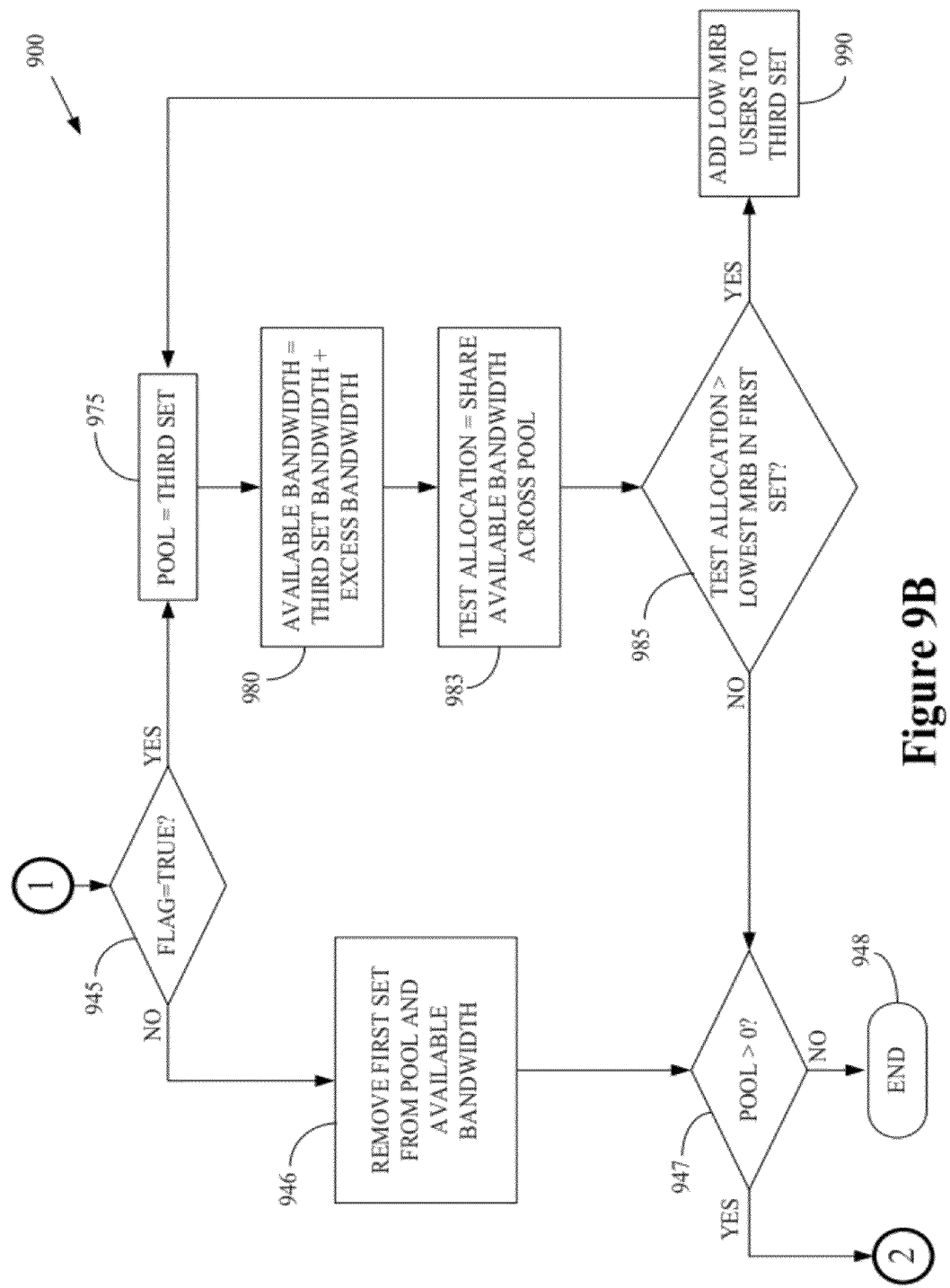

FIGS. 9A-B conceptually illustrates one exemplary embodiment of a method 900 for allocating and/or initializing bandwidth to users based on guaranteed bit rate and maximum bit rate requirements. In the illustrated embodiment, a functional entity that implements the method 900 (such as the scheduler 120 shown in FIG. 1) determines (at 905) whether the requested allocation is feasible. For example, a scheduler can add up all the required guaranteed bit rates for the mobile nodes (e.g., all the users in a pool of users that are being allocated resources) and determine whether sufficient bandwidth is available to satisfy at least these minimum requirements. The schedule may also verify that the guaranteed bit rates and maximum bit rates are consistent, e.g., the guaranteed bit rates for each user are less than the maximum bit rates for the corresponding user. Best effort users can be assumed to be guaranteed no bandwidth (and have no maximum bandwidth) for the purposes of determining (at 905) whether the requested allocation is feasible. If the proposed allocation is not feasible, then the method 900 may end. Alternatively, an alternative resource allocation may be proposed and the system may determine (at 905) whether or not the new allocation is feasible. This approach may be particularly useful when the method 900 is used for admission control.

If the allocation is feasible, equal bandwidth may be allocated (at 910) to each user in the pool of users so that the total available bandwidth is equally divided among all of the users in the pool. The scheduler may then determine (at 915) whether the target bandwidths for all of the users are satisfied. For example, the scheduler may determine (at 915) whether the equal bandwidth allocation satisfies the guaranteed bit rate requirements and the maximum bit rate requirements of all of the users. If the proposed allocation meets all of the bandwidth requirements, then the method 900 may end (at 920). If the proposed allocation does not meet all of the bandwidth requirements, then the scheduler determines (at 925) if a subset of the users requires more than the fair allocation of resources to meet their guaranteed bit rate requirements.

Users in the subset that require more than the fair allocation of resources are allocated (at 930) sufficient resources/bandwidth to meet their guaranteed bit rate requirements. For example, the scheduler may allocate (at 930) a minimum required bandwidth (MRB) that is the smallest bandwidth that can still be expected to meet the guaranteed bit rate requirement. The users in the subset are then added (at 935) to a first subset, which may be referred to as the GBR tight subset. A flag is set (at 940) to "FALSE" to indicate that the first subset is not maximal, e.g., it is possible that additional mobile nodes may be added to the first subset if the fair allocation of the remaining bandwidth does not satisfy the guaranteed bit rate requirement for users that are not currently in the first subset. The method can then proceed to a flag test (at 945). If the test determines (at 945) that the flag is not true, i.e., the flag has been set to FALSE, then the users in the first set are removed (at 946) from the pool of remaining users and the bandwidth that has been allocated to the users in the first set is removed (at 946) from the bandwidth that is available for allocation to the remaining users in the pool. If the scheduler determines (at 947) that any users remain in the pool, then the scheduler returns to step 910 to begin another iteration of the method 900. This branch may generate a monotone decreasing sequence of fair allocations as it builds up a monotone increasing candidate (not necessarily final) set of GBR tight users. This branch of the method 900 may in some cases continue to iterate until the scheduler determines (at 925) that none of the remaining users requires more than the fair allocation of the remaining bandwidth and the method 900 ends (at 948).

At this point, every user has an initial allocation that is feasible from a GBR constraint perspective since a solution is known to exist. As discussed below, some users may also be feasible from an MBR constraint perspective and iterations of the subsequent branch steps may generate a monotone increasing sequence of fair allocations as well as a set of MBR tight users. In this process, some GBR tight set users may be moved to the GBR and MBR slack set and users may also be moved from the GBR and MBR slack set to the MBR tight set. Feasibility (from a GBR perspective) is maintained for all users while increasing those that are feasible from MBR perspective also.

The feasibility of the allocation implies that some of the remaining users must require less than the fair allocation when none of the remaining users requires more than the fair bandwidth allocation. For example, some of the users must have maximum bit rates that can be exceeded if they received the fair allocation of resources/bandwidth. Put another way, in this case some of the users have maximum allowable bandwidths (MABs) that are lower than the fairly allocated bandwidths. The scheduler therefore allocates (at 950) a maximum allowable bandwidth (MAB) to the users that have the lowest values of the maximum allowable bandwidth. These users are also added (at 955) to a second set, which may be referred to as an MBR tight set. Membership in the second set is final and is not modified by further iterations of the method 900. Remaining users that were not added (at 955) to the second set are added (at 960) to a third set, which may be referred to as a GBR/MBR slack set. The excess bandwidth that is available after allocating (at 950) the MAB to the users in the second set is calculated (at 965) and the flag is set (at 970) to TRUE to indicate that the first subset is maximal, e.g., additional mobile nodes may not be added to the first subset during further iterations of the method 900. However, mobile nodes may be removed from the first subset during further iterations, as discussed below.

The method can then proceed to the flag test (at 945). If the test determines (at 945) that the flag is true, i.e., the flag has been set to TRUE, then the pool of remaining users is set (at 975) to be equal to the third set of users. The available bandwidth is then set (at 980) equal to the bandwidth that has been allocated to the users in the third set plus any excess bandwidth that has not yet been allocated to any users. The scheduler then determines (at 983) a test allocation by fairly (equally) dividing or sharing the available bandwidth across the pool of remaining users. The scheduler determines (at 985) whether the fair test allocation of the available bandwidth to the remaining users in the pool would result in a per-user allocation that is larger than the lowest minimum required bandwidth for any users in the first set. If not, then the method checks (at 947) whether any users remain in the pool and proceeds as described herein. However, if the fair test allocation is larger than the lowest minimum required bandwidth for any users in the first set, then the users from the first set that have an MRB lower than the fair allocation are added (at 990) to the third set and the pool of remaining users is set (at 975) to be equal to the modified third set of users, e.g., these users are removed from the first set and added to the third set. The loop (at 975, 980, 985, 990) iterates until the scheduler determines (at 985) that a fair allocation of the available bandwidth to the remaining users in the pool does not result in a per-user allocation that is larger than the lowest MRB for any users in the first set.

In one alternative embodiment, the largest maximal GBR tight set of all users can be constructed by allocating them their MRBs initially. The remaining resources may then be calculated and a water pouring algorithm, such as described in steps 950, 955, 960, 965, 975, 980, 985, and 990, may be used to perform the resource allocation. In some embodiments, when the GBR tight set determined by the method 900 is largest (flag=TRUE) and the allocation is incomplete so that the pool of remaining users includes at least one user, the method 900 skips the steps 930, 935 940 (and does not return to these steps) and the method 900 visits the step 950 for the first time.

This procedure iterates until all of the bandwidth requirements have been met and all of the bandwidth has been allocated. Since the allocation was determined (at 905) to be feasible, an allocation that meets all of these requirements exists. The weights (W, X, and/or Y) and/or priorities can be initialized by determining the weights and/or priorities as a function of the allocated resources/bandwidth. For example, the best effort users and any QoS users that receive the same bandwidth allocation as the best effort users can be assigned an initial weight of W=1. Users that are allocated larger bandwidths to meet their guaranteed bit rate requirements may be assigned larger weights so that users with the largest bandwidth requirements are initialized to the largest weights and users with relatively smaller bandwidth requirements are initialized to relatively smaller weights.

Embodiments of the method 900 may generate a feasible allocation that satisfies both GBR and MBR constraints for each user such that the individual allocations and final fair allocations satisfy the KKT conditions: users are in the GBR tight subset iff their MRB>final fair allocation; users are in the MBR tight subset iff their MAB<final fair allocation and all other users are in the GBR and MBR slack subset iff exactly final fair allocation—with no or minimal resources to spare. Embodiments of the method 900 may therefore generate an optimal solution.

In the maximal GBR tight set=FALSE phase (at 930, 935), the number of remaining users is strictly decreasing after each iteration until the method 900 exits this phase, which implies at most N steps in this phase. In the complementary maximal GBR tight set=TRUE phase (at 950, 955, 960, 965), the number of MBR tight set users is strictly increasing after each iteration until it exits the algorithm, once again implying at most N steps in this phase. In one embodiment, the users may be ordered in two lists, one in descending order of MRBs to aid the FALSE phase and the other in ascending order of MABs to aid the TRUE phase. The worst case complexity for (GBR, MBR) may then be 2NlogN steps to perform the sorting operations+2N (two phases), which leads to a process that has O(NlogN) steps. Although this does not rely on an explicit ordering of user and the "outer" algorithm above appears to run in O(2N) time, the "inner" steps can in the worst case each run (comparisons) through the set of all remaining users for deciding those that are GBR/MBR tight implying a cumulative N(N−1)/2 operations each, i.e., $O(N^2)$ complexity. However, two pre-sorted lists (ascending MABs for 950, 955, 960, 965 and descending MRBs for 930, 935) may only require checking the head user in each list each time or checking every user just once in each list during the course of the algorithm.

Embodiments of the techniques described herein may have a number of advantages over the conventional aggressive exponential weighting technique. In comparison to the existing solutions in conventional product base station schedulers, embodiments of the proposed linear weighting technique for weighted scheduling does a better job of achieving GBR targets, e.g., it is more likely to find a solution that satisfies the targets. Embodiments of the linear techniques may also be more resource efficient because they do not hamper channel peak picking or opportunistic scheduling in the same way that the exponential weighting techniques have been shown to do. The gains in efficiency translate to higher GBR user capacity and/or higher best effort and other services throughput. For example, embodiments of the claimed techniques have been shown to improve best effort throughput by up to 22% in the scenarios tested by the inventors. Moreover, the inventors have demonstrated double digit percentage improvement (on average 15%) for the linear weighting technique relative to the exponential weighting technique. Similar improvements can be projected for GBR user capacity. The proposed solution is very low complexity and in fact simpler than the conventional exponential weighting algorithm.

A 10-20% increase in capacity/throughput on a 10 MHz FDD LTE carrier (downlink) translates to a gain of about 1.2-2.4 Mbps. In monetary terms, independent analysis has suggested that it costs in the neighborhood of $2000 (via one or another scheme) to add 1 Mbps of capacity per base station. Thus, systems that implement embodiments of the techniques described herein can net (for negligible cost) savings of the order of $4000 per base station that in turn translates to hundreds of millions of dollars given the tens of thousands of base stations that have been deployed. Finally, the proposed changes are easy to implement and in fact, the core equations involve similar if not lesser amount of computation compared to the incumbent.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    setting, for a mobile node during a time interval, a first weight equal to a sum of a previous first weight associated with the mobile node during a previous time interval and a correction factor that is a linear function of a difference between a first bit rate and an indication of a throughput of the mobile node; and
    scheduling communication with the mobile node based on the first weight.

2. The method of claim 1, wherein scheduling said communication with the mobile node comprises scheduling said communication with the mobile node using the larger of the first weight and a weight associated with best effort scheduling.

3. The method of claim 1, comprising determining the correction factor as a function of a difference between a guaranteed bit rate for the mobile node and a throughput of the mobile node during the time interval or an over-the-air transport block size of the mobile node during the time interval.

4. The method of claim 1, wherein scheduling said communication with the mobile node comprises scheduling communication with the mobile node over at least one channel using a priority that is determined by the first weight and an indication of a quality of said at least one channel.

5. The method of claim 1, wherein setting the first weight for the first mobile node comprises setting a plurality of first weights for a plurality of mobile nodes, wherein each of the plurality of first weights is equal to a sum of a corresponding previous first weight during the previous time interval and a correction factor that is a linear function of a difference between a first bit rate and an indication of a throughput of the corresponding mobile node.

6. The method of claim 5, comprising initializing the plurality of first weights for the plurality of mobile nodes using an iterative procedure that allocates a minimum bandwidth to achieve guaranteed bit rate for a first portion of the mobile nodes and fairly allocates remaining bandwidth to a second portion of the mobile nodes, and wherein each of the plurality of first weights is a function of the corresponding allocated bandwidth.

7. The method of claim 6, wherein the first portion comprises all of the mobile nodes and the second portion is an empty set or wherein the first portion is an empty set and the second portion comprises all of the mobile nodes.

8. The method of claim 5, wherein setting the first weight comprises setting the first weight equal to a sum of the previous first weight and a correction factor that is a linear function of a difference between a guaranteed bit rate and the indication of the throughput of the mobile node, and further comprising:
    setting, for the mobile node during the time interval, a second weight equal to a sum of a previous second weight associated with the mobile node during the previous time interval and a correction factor that is a linear function of a difference between a maximum bit rate and the indication of the throughput of the mobile node; and
    scheduling communication with the mobile node based on a final weight that is equal to the lesser of the second weight and the larger of the first weight and the weight associated with best effort scheduling.

9. The method of claim 8, comprising initializing a plurality of final weights for a plurality of mobile nodes using an iterative procedure that allocates bandwidth to each of the mobile nodes subject to constraints imposed by at least one of a guaranteed bit rate or a maximum bit rate for each of the mobile nodes, and wherein each of the plurality of final weights is a function of the corresponding allocated bandwidth.

10. The method of claim 9, comprising performing admission control based on results of the iterative procedure to allocate bandwidth to the mobile nodes.

11. The method of claim 9, comprising scheduling communication for the plurality of mobile nodes based on the plurality of final weights.

12. The method of claim 11, wherein scheduling communication for the plurality of mobile nodes comprises scheduling communication for at least one streaming application associated with the plurality of mobile nodes based on the plurality of final weights.

13. A method, comprising:
    recursively defining a weight associated with a mobile node using a linear function of a previous value of the weight and a difference between a first bit rate and an indication of a throughput of the mobile node; and
    scheduling communication with the mobile node based on the first weight.

14. The method of claim 13, wherein scheduling said communication with the mobile node comprises scheduling communication with the mobile node over at least one channel using a priority that is determined by an indication of a quality of said at least one channel and the larger of the first weight and a weight associated with best effort scheduling.

15. The method of claim 13, wherein recursively defining the weight comprises determining the correction factor as a function of a difference between a guaranteed bit rate for the mobile node and at least one of a throughput of the mobile node during the time interval or an over-the-air transport block size of the mobile node during the time interval.

16. The method of claim 15, wherein recursively defining the weights comprises recursively defining the weight as the lesser of a second weight and the larger of the first weight and a rate associated with best effort scheduling, wherein the first weight is recursively defined by a previous first weight and a correction factor that is a linear function of a difference between the guaranteed bit rate and the indication of the throughput of the mobile node, and wherein the second weight is recursively defined by a previous second weight associated with the mobile node during the previous time interval and a correction factor that is a linear function of a difference between a maximum bit rate and the indication of the throughput of the mobile node.

17. The method of claim 16, wherein recursively defining the weight for the first mobile node comprises recursively defining a plurality of weights for a plurality of mobile nodes, wherein each of the plurality of weights is recursively defined by a corresponding previous weight during the previous time interval and a correction factor that is a linear function of a difference between a first bit rate and an indication of a throughput of the corresponding mobile node.

18. The method of claim 17, comprising initializing the plurality of weights for a plurality of mobile nodes using an iterative procedure that allocates bandwidth to each of the mobile nodes subject to constraints imposed by at least one of a guaranteed bit rate or a maximum bit rate for each of the mobile nodes, and wherein each of the plurality of weights is a function of the corresponding allocated bandwidth.

19. The method of claim 18, comprising performing admission control based upon the iterative procedure to allocate bandwidth to the mobile nodes.

20. The method of claim 18, wherein recursively defining the plurality of weights for the plurality of mobile nodes comprises recursively defining the plurality of weights for a first portion of the mobile nodes having a selected quality-of-service and a second portion of the mobile nodes that operate in best effort mode.

21. The method of claim 20, wherein the first portion comprises all of the mobile nodes and the second portion is an empty set or wherein the first portion is an empty set and the second portion comprises all of the mobile nodes.

22. The method of claim 20, comprising scheduling communication for the plurality of mobile nodes based on the plurality of weights.

23. The method of claim 22, wherein scheduling communication for the plurality of mobile nodes comprises scheduling communication for at least one streaming application associated with the plurality of mobile nodes based on the plurality of weights.

* * * * *